Aug. 12, 1958 C. R. STRADLEY 2,847,507
AUTOMATIC ALARM SYSTEM
Filed Sept. 11, 1953
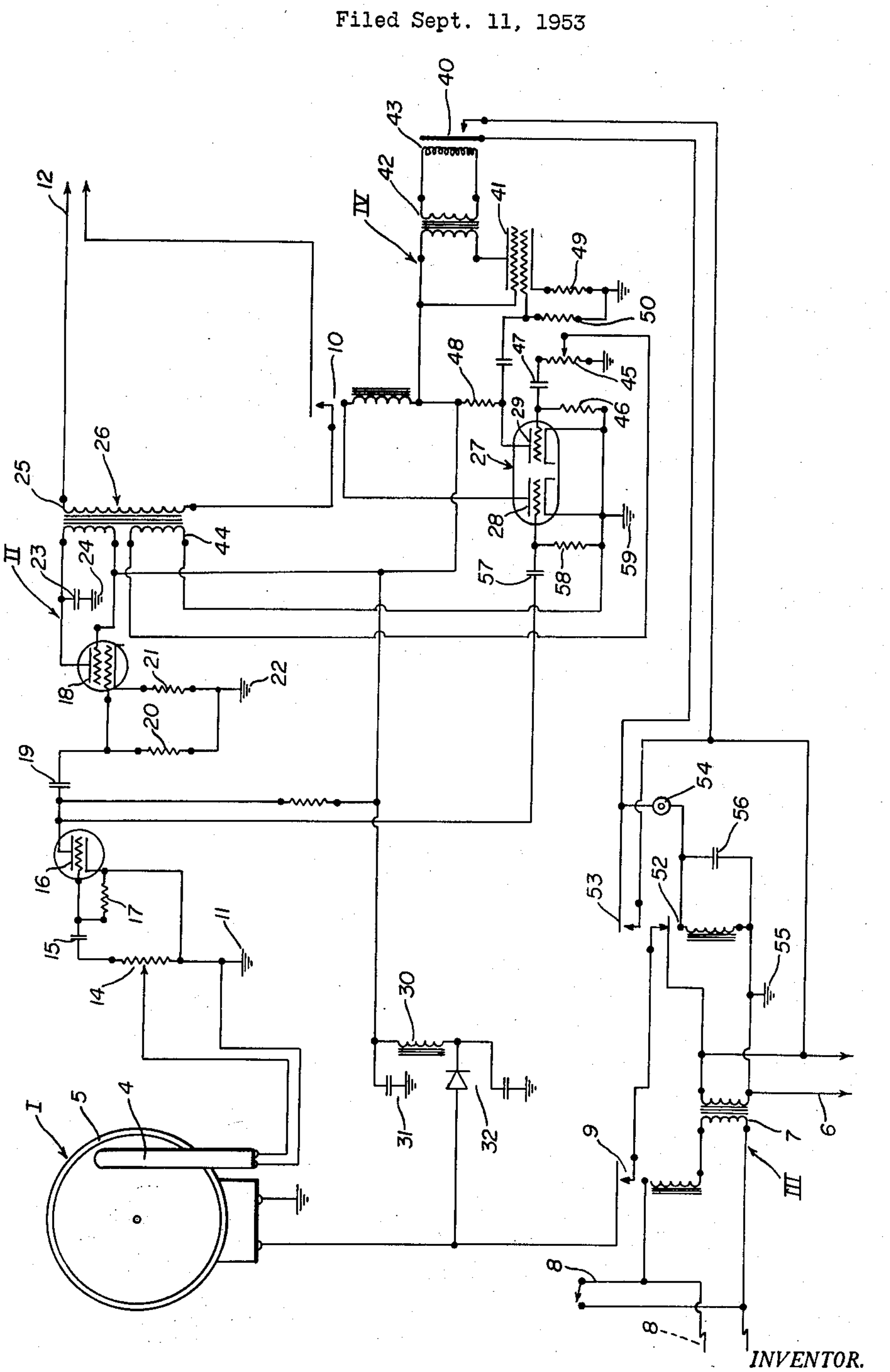
INVENTOR.
Charles R. Stradley
BY
W. A. McGrew
ATTORNEY United States Patent Office 2,847,507 Patented Aug. 12, 1958

2,847,507

AUTOMATIC ALARM SYSTEM

Charles R. Stradley, Littleton, Colo.

Application September 11, 1953, Serial No. 379,494

3 Claims. (Cl. 179—5)

This invention relates to an automatic alarm system, and in particular relates to a system for transmitting an alarm to a central station announcing illegal entry, a fire, etc.

The present invention provides a device for transmitting an alarm to a central station, generally along installed telephone wires. The device may be actuated so as to send the alarm in by means of contact switches, thermostatic switches, and the like. The operation of the switches actuates the mechanism to dial a central station, and on the central station answering the call, a sound transcriber announces the location, and other pertinent information required, so that aid may be immediately sent to the point. The system comprises in general a sound transcriber, an impulse transmitter, a simple amplifier, and a switch for turning off the device from the central station. The operation of the sound transcriber is controlled by the detector breaker switches. If the device is to send an alarm on a fire, thermostatic switches control the operation of the circuit. If the device is to announce illegal entry, contact switches control the operation of the alarm circuits. On actuating the sound transcriber by the operation of one of the switches in the system, an audio signal is given which is picked up by an amplifier and transmitted to the dialing relay. The audio signal corresponds to the impulse of the dial number of the central station, so that when the audio signal is transmitted through the dialing relay, the dial telephone relay station closes the circuit to the central station, the same as if a telephone were being dialed. The audio signal sent by the dialing relay corresponds to the dial number of the central station, which may be the fire station or police station as the case may be. At the board of the central station, the call is answered, and when the pick-up of the sound transcriber passes the audio dial signal area, the name of the alarm owner, the street address, etc. of the location of the transmitter, having previously been recorded on the sound transcriber, is transmitted to the central station. When the central station has acquired the information needed, a tone switch is thrown which is transmitted through a vibrating reed switch to a relay and holding coil to turn off the system in the house in question. The holding coil maintains the system completely off until released by a reset button.

It is noted that the device is connected to the telephone lines independent of the instrument itself. Therefore, there is no connection between the telephone instrument and the alarm device itself. The two may be separated over substantial distances in any one location, so long as the alarm device is connected to the wires leading to the telephone instrument. The alarm device may have a local audio alarm when in operation, but has no effect on the subscriber's phone so long as the alarm system is inoperative.

It is an object of the invention therefore to provide an improved automatic alarm system adapted for connection to a telephone line.

It is another object of the present invention to provide an electronic dialing system which is not connected through the telephone instrument.

It is a still further object of the present invention to provide a simplified efficient alarm or reporting system adapted for connection to a telephone line.

It is yet another object of the present invention to provide an alarm device which is adapted to dial a central station, relay a message, and then is adapted to be turned off from the central station on receipt of the message.

These and other advantages of the present invention will be readily apparent to those skilled in the art as the following description proceeds.

The figure is a schematic wiring diagram of an alarm system according to the present invention.

The device illustrated in the figure comprises, in general, a sound transcriber, indicated generally by Roman numeral I, an audio amplifier and relay circuit generally indicated by Roman numeral II, a power circuit indicated generally by Roman numeral III, and a power turn-off circuit generally indicated by Roman numeral IV. As illustrated, the sound transcribing system is a low-speed phonograph, such as a 45 R. P. M. phonograph, however, any sound transcribing system may be used. For instance, a magnetic wire or tape recorder may be used in the place of the phonograph. The function of the sound transcriber is to provide a dialing tone, for dialing a central station, and on getting the station, to transmit certain information concerning the location of the transcriber. It is preferable to have an automatic changer for the sound transcriber in the event that the record or wire or tape runs out before the central station answers the call. A phonograph 5 is operated by current from a 110 volt line 6 which is connected to the system. A 12 volt transformer 7 steps down the power from the 110 volt line to operate a detector system having plural detector switches 8. The system is activated by the closing of one or more of the plural switches 8, which may be thermal switches or contact switches depending on the use. In general, the house or premises may be guarded by the alarm system which has a series of switches placed in strategic spots about the building. The operation of one of the switches 8 closes a relay 9 and puts the device into operation. On the closing of the relay 9, the phonograph 5 goes into operation. The record of the phonograph has transcribed thereon an audio signal which is equivalent to the electrical impulse of the dialing number of the central station. The phonograph pick-up arm 4 transmits the audio signal to the amplifier circuit which amplifies the signal and transmits it to a plate relay 10. The relay 10 transmits the impulse by making and breaking the telephone line and transmits and equivalent audio impulse as an electrical impulse to the telephone dialing station where the impulse closes the circuit to the central station completing the telephone circuit to that point. The central station then answers the call to obtain the necessary information.

The audio circuit comprises a resistor 14 of 500 kilohms, a condenser of .02 microfarad and an amplifying tube 16, which is a 12AT6 tube, and a 6.7 megohm grid return resistor 17. A ground 11 completes the circuit to the amplifier tube. The 12AT6 is a preamplifier for amplifying tube 18, which is a 50B5 modulator for a telephone line 12. A .02 microfarad condenser and a 500 kilohm resistor 20, and a 100 ohm resistor 21 leading from a ground 22 completes the circuit to the modulator tube 18. A .02 microfarad condenser 23 and the ground 24 leading from the modulating tube 18 is connected to the output side 25 of an output-input transformer 26. The tube 16, that is, the 12AT6 is also a preamplifier for a tube 27, which is a 12AT7, of which one half 28 is used in the circuit from the tube 16 to the relay 10 for dialing the central station. A filter choke 30, an 80 microfarad condenser-ground 31, and a selenium rectifier including a 40 microfarad condenser-ground 32 completes the circuit to the relay 10 for converting the A. C. line current to D. C. current for use in the alarm circuit. A 470 kilohm resistor across the amplifying line from the phonograph pick-up and the power line leading to the relay 10, completes the amplifying circuit which is a resistance-coupled amplifying system.

The amplifying circuit passes through the tubes 16 and half of 27 and subsequently to the relay 10 which makes and breaks the telephone line circuit to transmit the audio signals as breaks in the telephone line current. The signal is transmitted to the telephone dial station where mechanism connects the circuit of the central station to the circuit of the alarm system. The audio signal from the record is impressed on the telephone line, through the amplifier circuit, once, and then there is about a thirty second delay, after which the message giving the location and other data is transmitted in the event that central station has answered the telephone call. In the event that central station has not picked up their telephone, there is a break of five seconds of silence, then a two to three second tone to open the relay 10, which has the same effect as hanging up the telephone, and then the phonograph puts out again the dialing impulses.

When the central station has received the needed information, there is manually impressed, from the central station, on the telephone wire 12 a tone which is tuned to a normally open resonant reed 40, which reed is a part of a switch for turning off the device. The turn-off circuit includes a power amplifying tube 41, which is a 6AK6 for energizing an output transformer 42 and connected reed coils 43. The 6AK6 is connected to the other half 29 of the 12AT7 tube 27, which acts as a preamplifier for the 6AK6 tube. A 500 kilohm resistor, ground 45, and a 470 kilohm resistor 46 completes the power input side 29 of the tube 27 for the shut-off circuit. A 0.01 microfarad condenser is connected between the two resistors 46 and 45. A 470 kilohm resistor 48 leading from the relay 10 to the power amplifier 46 completes the return circuit to the resilient reed 40. The tube circuit is completed by a 100 ohm resistor and ground 49 and a 500 kilohm resistor connected therewith. The resonant reed 40 acts, in response to a tone impressed on line 12, to close the circuit of relay 52 which has a holding circuit to hold the relay in actuated position. The relay 52 operates to open its contacts in the line to switch 9 and the phonograph and also closes holding contacts 53 which hold the relay in closed circuit position should the contacts of relay 40 open, and it is retained in that position until the reset button 54 is pushed to open the circuit of the contacts 53 thereby releasing the relay. A ground 55 and a 1 microfarad condenser 56 completes the circuit across the relay and the holding coil.

The impressed tone signal from the central station along telephone wires 12 is impressed upon the circuit through input portion 44 of the input-output transformer 26. The input circuit connected to the side 29 of tube 27 includes a .05 microfarad condenser 57 and a 470 kilohm resistor 58 with the ground 59 leading to resistor 46. The impressed tone through transformer 44 and the amplifying tubes 29 and 41 vibrates the reed 40 which is tuned to the same frequency as the impressed tone, for locking the circuit in off position. This prevents the device from continuing operation once the message has been received. For instance, if the device had no locking means, the record player would continue to repeat both dial signal and the message to the central station preventing further use of that phone circuit to the central station. The shut-off device is, therefore, very important for the operation of the alarm system.

While the alarm system has been shown with a particular form of amplifying circuit for impressing the correct signals on the telephone line, any satisfactory circuit may be used. Likewise, the input circuit from the central station operating the hold circuit to stop the operation of the alarm device may likewise by changed to any suitable circuit. Likewise, although the sound transcriber is shown as a phonograph transcriber, any suitable sound transcriber may be used. A magnetic recorder has certain distinct advantages, for example, there is no static from the pick-up head which is especially important if there is continued use contemplated for the device. Also, a magnetic transcriber is, in general, a very simple device which is preferable since it prevents complexity of the device, and, also, provides a more economical alarm system.

The alarm system is adaptable to substantially any detecting circuit, where a change may be used to operate a switch in the detector system. Further, several detector systems can be connected to one alarm system, using a record selector, and various data may be transmitted, recorded, etc. For example, with a record selector, a circuit may be used for fire protection, one for police protection, and one for appliance portection, for example to warn the owner of power failure of a freezer. In the first case, a record would be selected to ring the fire department; in the second case, to ring the police station; and the third case to ring a warning bell, or even ring the owner's own phone to give the warning.

I claim:

1. In an automatic alarm system adapted for connection through telephone lines to a central station inclusive of a detector circuit with plural switches for activating the circuit, which comprises means responsive to disturbance of said switches for activating said detector circuit, means inclusive of a sound transcriber responsive to activation of said circuit for reproducing an audio impulse corresponding to the dial number impulses of said central station, means inclusive of an amplifying circuit for picking up said audio impulse and impressing an equivalent impulse on said telephone lines to dial the telephone number of said central station, means in a said sound transcriber inclusive of an audio tone break and a repeat of the audio dial impulses for redialing the number of said central station when the circuit is not completed, means inclusive of an audio signal for relaying information to said central station on completing connection thereto, and means inclusive of a resonant reed operating a holding coil switch for breaking the alarm circuit operative from said central station by impressing a tone resonant with said reed for operating said holding coil to break the alarm circuit and prevent further automatic operation of the activated circuit.

2. In an automatic alarm system adapted for connection through telephone lines to a central station inclusive of a detector circuit with plural switches for activating the circuit, which comprises means responsive to disturbance of said switches for activating said detector circuit, means inclusive of automatically repeating sound transcriber responsive to activation of said circuit for reproducing an audio impulse corresponding to the dial number impulses of said central station, means inclusive of an amplifying circuit for picking up said audio impulse and impressing an equivalent impulse on said telephone lines to dial the telephone number of said central station, means in said sound transcriber inclusive of an audio tone break and a repeat of the audio dial impulses for redialing the number of said central station when the circuit is not completed, means inclusive of said sound transcriber and amplifying system transmitting an audio signal for relaying information to said central station on completing connection thereto, and means inclusive of a resonant reed operating relay switch and a holding coil for breaking the alarm circuit operative from said central station by impressing a tone resonant with said reed for operating said relay and holding coil to break the alarm circuit and prevent further automatic operation of the activated circuit.

3. An automatic alarm system comprising a detector circuit, alarm switch means for activating said detector circuit, means responsive to said activated detector circuit for starting a repeating sound reproducing unit, said reproducing unit inclusive of means for repetitively reproducing an audio-dialling impulse and an audio message, means for amplifying said audio-dialling impulses whereby to operate a telephone line relay to dial the number of a predetermined central station, a turn-off circuit inclusive of a tone responsive reed relay and a break switch for stopping said system, input and output transformer means for impressing output impulses on the telephone line from the amplifying means and impressing impulses from the telephone line on said turn-off circuit, and tone reproduction means operable from said central station for impressing the responsive tone on the telephone lines to operate said tone-responsive relay for stopping the alarm system.

References Cited in the file of this patent

UNITED STATES PATENTS

| | | |
|---|---|---|
| 2,084,242 | Cassel | June 15, 1937 |
| 2,090,574 | Davidson | Aug. 17, 1937 |
| 2,099,913 | Tuscher et al. | Nov. 23, 1937 |
| 2,399,229 | Jacobson | Apr. 30, 1946 |
| 2,498,613 | Talbot | Feb. 21, 1950 |
| 2,589,800 | Goodale | Mar. 18, 1952 |